US009507342B2

(12) United States Patent
De Prosperis et al.

(10) Patent No.: US 9,507,342 B2
(45) Date of Patent: Nov. 29, 2016

(54) AIRCRAFT ENGINE SYSTEMS AND METHODS FOR OPERATING SAME

(75) Inventors: Roberto De Prosperis, Florence (IT); Paolo Di Sisto, Florence (IT); Maciej Borkowski, Warsaw (PL)

(73) Assignee: NUOVO PIGNONE S.P.A., Florence (IT)

( * ) Notice: Subject to any disclaimer, the term of this patent is extended or adjusted under 35 U.S.C. 154(b) by 0 days.

(21) Appl. No.: 14/235,576

(22) PCT Filed: Jul. 25, 2012

(86) PCT No.: PCT/EP2012/064621
§ 371 (c)(1),
(2), (4) Date: May 7, 2014

(87) PCT Pub. No.: WO2013/014202
PCT Pub. Date: Jan. 31, 2013

(65) Prior Publication Data
US 2014/0244133 A1 Aug. 28, 2014

(30) Foreign Application Priority Data
Jul. 28, 2011 (IT) .............................. CO2011A0032

(51) Int. Cl.
*F02D 45/00* (2006.01)
*G05B 23/02* (2006.01)

(52) U.S. Cl.
CPC ....... *G05B 23/0208* (2013.01); *G05B 23/0283* (2013.01)

(58) Field of Classification Search
USPC ......... 701/29.1, 29.3, 29.4, 29.6, 31.9, 32.1, 701/32.9, 33.4, 33.5, 99, 100; 702/182, 183
See application file for complete search history.

(56) References Cited

U.S. PATENT DOCUMENTS

| 4,875,170 | A | 10/1989 | Sakurai et al. |
| 5,455,777 | A | 10/1995 | Fujiyama et al. |
| 5,581,039 | A | 12/1996 | Yasutomi et al. |
| 6,801,871 | B2 | 10/2004 | Ishii et al. |
| 7,162,373 | B1 * | 1/2007 | Kadioglu et al. ............... 702/35 |
| 7,243,042 | B2 | 7/2007 | Plotts et al. |

(Continued)

FOREIGN PATENT DOCUMENTS

| CN | 1086316 A | 5/1994 |
| CN | 1489041 A | 4/2004 |

(Continued)

OTHER PUBLICATIONS

Gas Turbine Repair Technology, K.J. Pallos, Apr. 2001, Atlanta GA.*

(Continued)

*Primary Examiner* — Thomas Tarcza
*Assistant Examiner* — Edward J Pipala
(74) *Attorney, Agent, or Firm* — GE Global Patent Operation; Marc A. Vivenzio

(57) ABSTRACT

A device and a method for determining a residual life expectancy of a rotor of a gas turbine. The method includes receiving at a computer operating conditions of the gas turbine, receiving a gas turbine rotor inspection result, updating, based on the operating conditions of the gas turbine and the gas turbine rotor inspection result, a database for a fleet corresponding to the gas turbine, and calculating the residual life expectancy of the rotor of the gas turbine.

18 Claims, 6 Drawing Sheets

(56) References Cited

U.S. PATENT DOCUMENTS

| | | |
|---|---|---|
| 2003/0120402 A1 | 6/2003 | Jaw |
| 2004/0073400 A1 | 4/2004 | Tomita et al. |
| 2004/0148129 A1 | 7/2004 | Gotoh et al. |
| 2008/0148706 A1* | 6/2008 | Beauregard .................. 60/39.01 |
| 2008/0243352 A1 | 10/2008 | Healy |
| 2012/0130688 A1* | 5/2012 | Jiang et al. ....................... 703/2 |
| 2012/0294704 A1* | 11/2012 | Willett, Jr. ..................... 415/118 |

FOREIGN PATENT DOCUMENTS

| | | | |
|---|---|---|---|
| EP | 1217189 A1 | 6/2002 | |
| EP | 2392983 A2 | 12/2011 | |
| JP | 10293049 A | 11/1998 | |
| JP | 2001166819 A | 6/2001 | |
| JP | 2011163345 A * | 8/2011 | ............. F01D 25/00 |

OTHER PUBLICATIONS

Italian Search Report and Written Opinion dated Feb. 20, 2012 which was issued in connection with Italian Patent Application No. CO2011A000032 which was filed on Jul. 28, 2011.

International Search Report and Written Opinion dated Oct. 23, 2012 which was issued in connection with PCT Patent Application No. PCT/EP2012/064621 which was filed on Jul. 25, 2012.

Gebhardt "Rotor Life Management: A Smarter Approach to Extending Gas Turbine Life", Power Generation, pp. 34-36, Jul.-Aug. 2010.

Unofficial English Translation of Chinese Office Action issued in connection with corresponding CN Application No. 201280037868.8 on Jun. 26, 2015.

Unofficial English Translation of Japanese Office Action issued in connection with corresponding JP Application No. 2014-522085 on Apr. 26, 2016.

\* cited by examiner

AIRCRAFT ENGINE SYSTEMS AND METHODS FOR OPERATING SAME

BACKGROUND OF THE INVENTION

Embodiments of the subject matter disclosed herein generally relate to methods and systems and, more particularly, to mechanisms and techniques for predicting and optimizing the operating life of a gas turbine, or components therein.

FIG. 1, which is similar to FIG. 1 of U.S. Patent Application Publication 2008/0243352 (incorporated herein by reference), illustrates an example of a gas turbine 10 having a compressor 12, a combustor 14, a turbine 16 coupled to the compressor 12, and a computer control system (controller) 18. An inlet duct 20 to the compressor 12 may feed ambient air to compressor 12. The inlet duct 20 may have ducts, filters, screens and noise abatement devices that contribute to a pressure loss of ambient air flowing through the inlet 20 and into inlet guide vanes 21 of the compressor 12. An exhaust duct 22 for the turbine directs combustion gases from the outlet of the turbine 10 through, for example, emission control and noise abatement devices. The turbine 10 may drive a generator 24 that produces electrical power. Alternatively, whenever the turbine is a two shaft device (e.g., including a high pressure turbine and a low pressure turbine), the low pressure turbine, which can turn at a different speed than the high pressure rotor, may drive a more generic machine as a compressor or even a generator.

The operation of the gas turbine 10 may be monitored by several sensors 26 designed to measure different performance-related variables of the turbine 10, the generator and the ambient environment. For example, groups of redundant temperature sensors 26 may monitor ambient temperature surrounding the gas turbine 10, compressor discharge temperature, turbine exhaust gas temperature, and other temperature measurements of the gas stream through the gas turbine 10. Similarly, groups of redundant pressure sensors 26 may monitor ambient pressure, and static and dynamic pressure levels at the compressor inlet and outlet turbine exhaust, at other locations in the gas stream through the gas turbine 10. Groups of redundant humidity sensors 26, for example, wet and dry bulb thermometers, may measure ambient humidity in the inlet duct of the compressor 12. Groups of redundant sensors 26 may also include flow sensors, speed sensors, flame detector sensors, valve position sensors, guide vane angle sensors, or the like, that sense various parameters pertinent to the operation of gas turbine 10. As used herein, "parameters" refer to items that can be used to define the operating conditions of the turbine, such as, but not limited to, temperatures, pressures, and gas flows at defined locations in the turbine.

Also, the fuel control system 28 regulates the fuel flowing from a fuel supply to the combustor 14, one or more splits between the fuel flowing into primary and secondary fuel nozzles, and the amount of fuel mixed with secondary air flowing into a combustion chamber. The fuel control system 28 may also select the type of fuel for the combustor. The fuel control system 28 may be a separate unit or may be a component of the main controller 18. The controller 18 may be a computer system having at least one processor that executes programs and operations to control the operation of the gas turbine using sensor inputs and instructions from human operators. The commands generated by the controller 18 may cause actuators on the gas turbine to, for example, adjust valves (actuator 27) between the fuel supply and combustors that regulate the flow, fuel splits and type of fuel flowing to the combustors, adjust inlet guide vanes 21 (actuator 29) on the compressor, adjust inlet bleed heat, as well as activate other control settings on the gas turbine.

The turbine may have a wide application in the oil and gas field. That is, it may drive compressors in the pipelines as well it may still drive compressors to pump out petrol or natural gas from wells. An important critical quality (CTQ) for oil and gas companies is the availability of their plants so to maximize production. To minimize plant shut down or disruption, plant core parts, such as the gas turbine, are ideally replaced/maintained just when their probability of failure has a substantial impact on plant reliability. Another important CTQ is maintenance cost, which should be minimized wherever possible.

To improve these and other CTQs, various entities have launched life extension initiatives as CBM (condition based maintenance) and RLM (rotor life management). Some techniques rely solely on optical inspections to measure crack lengths to develop a statistical distribution of crack lengths. This statistical distribution is used to estimate equipment life expectancy. Another technique involves inspecting a component for damage or deterioration (e.g., micro-cracks), forming a structural model of the device, setting a future use condition for the device, and simulating an advancement of the damage or deterioration. Another approach is to estimate creep damage via an expression including a Larson-Miller expression, and then performing statistical analysis (e.g., Weibull statistical analysis) to estimate future creep damage. Here, an estimation parameter based on an equipment start count and thermal stress is calculated based on a statistical model. Another approach is to determine a relationship between a metal temperature of a turbine component and an operating condition of the turbine housing the component. This approach uses a thermal model of the component and an operating history of the turbine to predict a current or future component operating temperature.

However, the conventional methods and systems for plant and turbine life extension require plant shut down for inspections to collect data (e.g., crack lengths) and in general are not applicable for components that do not show evident failure. Accordingly, it would be desirable to provide systems and methods that avoid the afore-described problems and drawbacks.

BRIEF SUMMARY OF THE INVENTION

Aspects of embodiments of the invention relate to systems and methods for predicting and optimizing an operating life of gas turbine components (e.g., rotors), especially components not showing evident damage and for which a long operating life is expected but that, due to high thermo-mechanical loads, may crack and quick degenerate into an engine failure that may compromise plant safety.

According to an exemplary embodiment, there is a method for determining a residual life expectancy of a rotor of a gas turbine. The method includes receiving at the computer operating conditions of the gas turbine; receiving a gas turbine rotor inspection result; updating, based on the operating conditions of the gas turbine and the gas turbine rotor inspection result, a database for a fleet corresponding to the gas turbine; and calculating the residual life expectancy of the rotor of the gas turbine.

According to an exemplary embodiment, a device configured to determine a residual life expectancy of a gas turbine component. The device including a memory and a processor operatively connected to the memory. The processor is configured to: receive operating conditions of the gas turbine; receive a gas turbine rotor inspection result; update, based on the operating conditions of the gas turbine and the gas turbine rotor inspection result, a database for a fleet corresponding to the gas turbine; and calculate the residual life expectancy of the rotor of the gas turbine.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a gas turbine, in particularly to a rotor. However, the embodiments to be discussed next are not limited to these systems, but may be applied to other systems.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Gas turbines require periodic inspections to ensure the minimization of operational and safety risks. Maintenance factors for rotors include both starts and operating hours. These inspections assess the health of a customer's rotor by compiling and utilizing pertinent information, including: operational variables (model time, cycle, and temperature to assess their impact on low cycle fatigue and creep); material history (including models of the application environment, duty cycle, and maintenance practices); subcomponent condition (determined by closely examining subcomponents for damage and fit). With this information, it is possible to make an informed recommendation for rotor life extension or retirement. When replacement is warranted, the novel process can provide recommendations regarding the possibility of either an in-kind replacement, or the installation of a new rotor.

Figure 1:
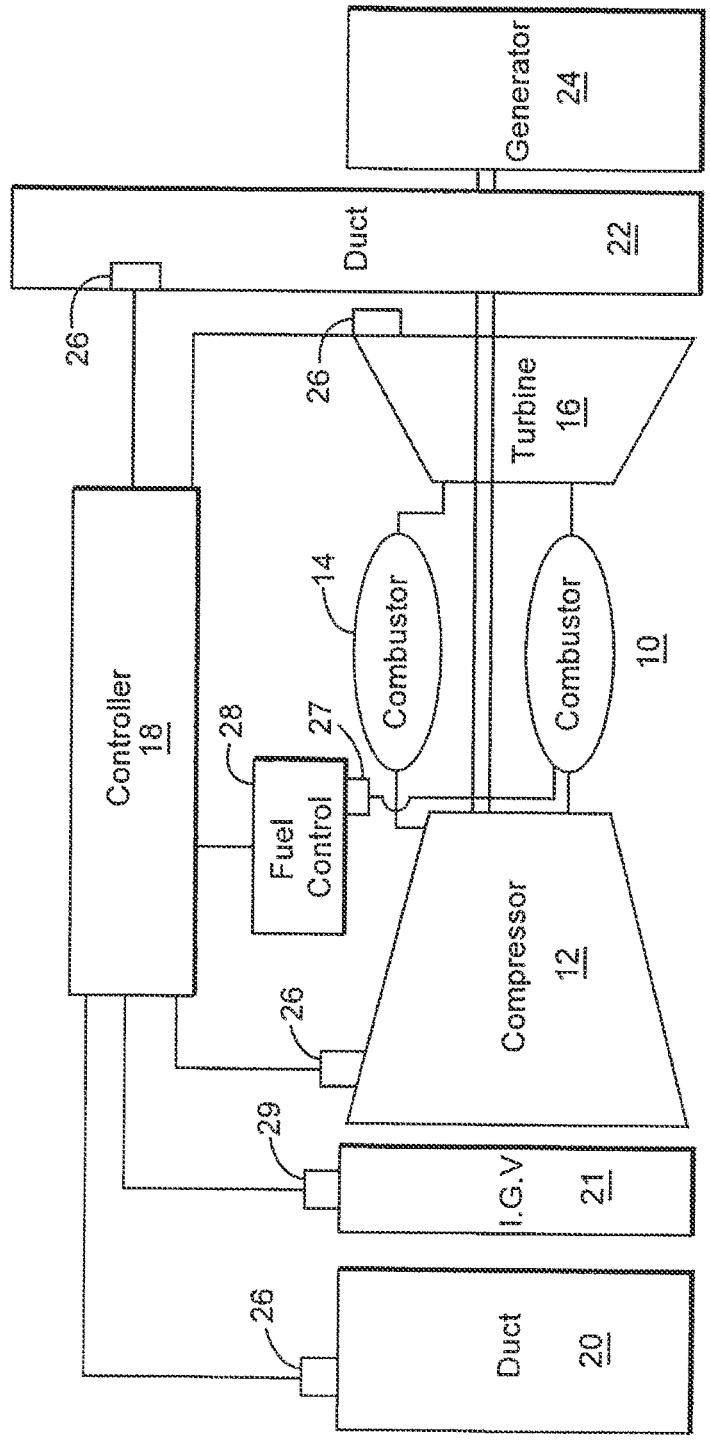
FIG. 1 illustrates an example of a gas turbine.
Figure 2:
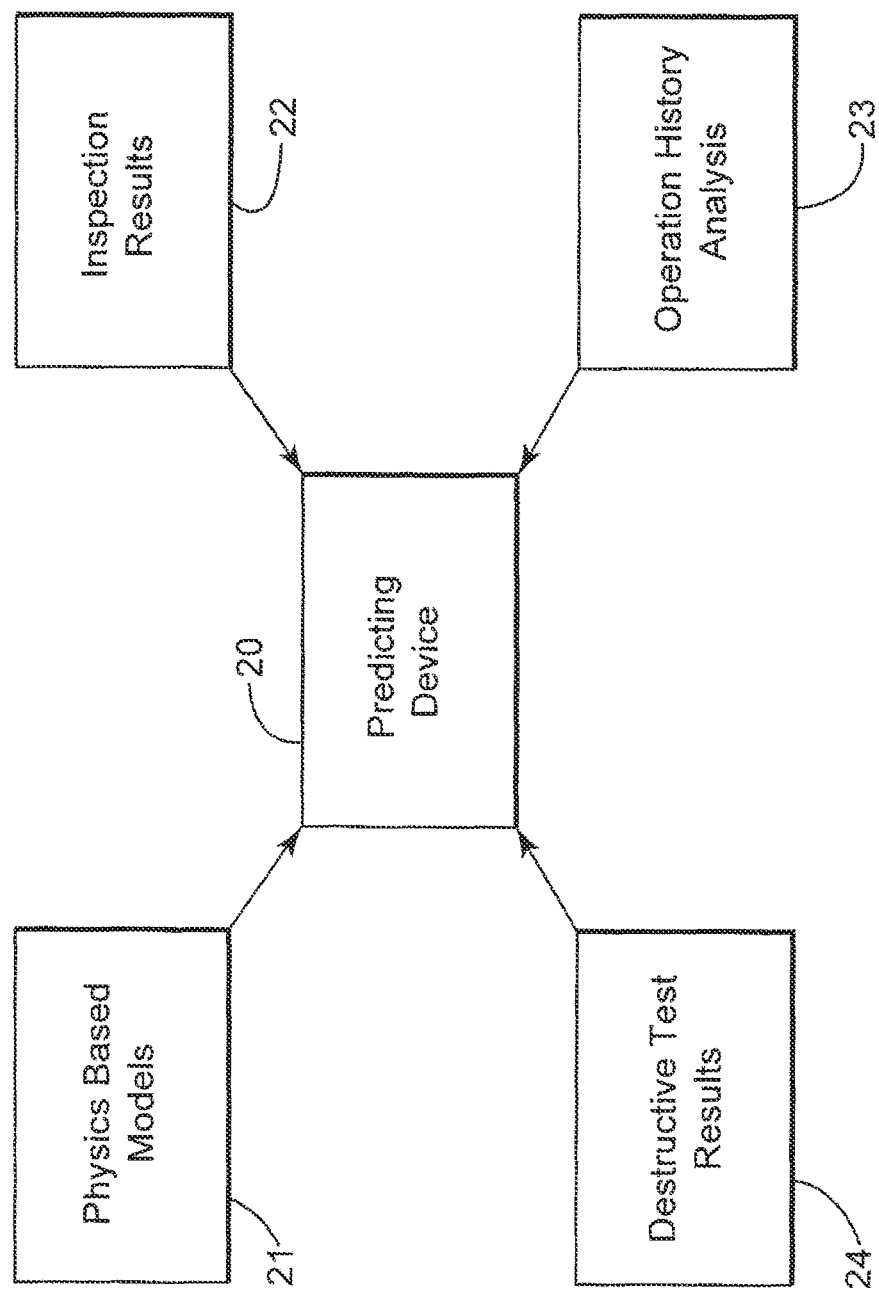
FIG. 2 illustrates four concepts underpinning an embodiment of the invention.

As shown in FIG. 2, according to one embodiment, there is a method for predicting component life with greater accuracy than is possible with conventional systems and methods. This method may be implemented in a predicting device 20 that will be discussed in more detail later. The method is based on four concepts: physics based models for predicting a probabilistic life of one or more gas turbine components (21), results of a thorough inspection of the components (22), results of an evaluation of the history of the operating life of the engine to which the part belongs (23), and results from destructive tests on some parts (24). These four concepts may be linked in a method having multiple phases as discussed below.

Figure 3:
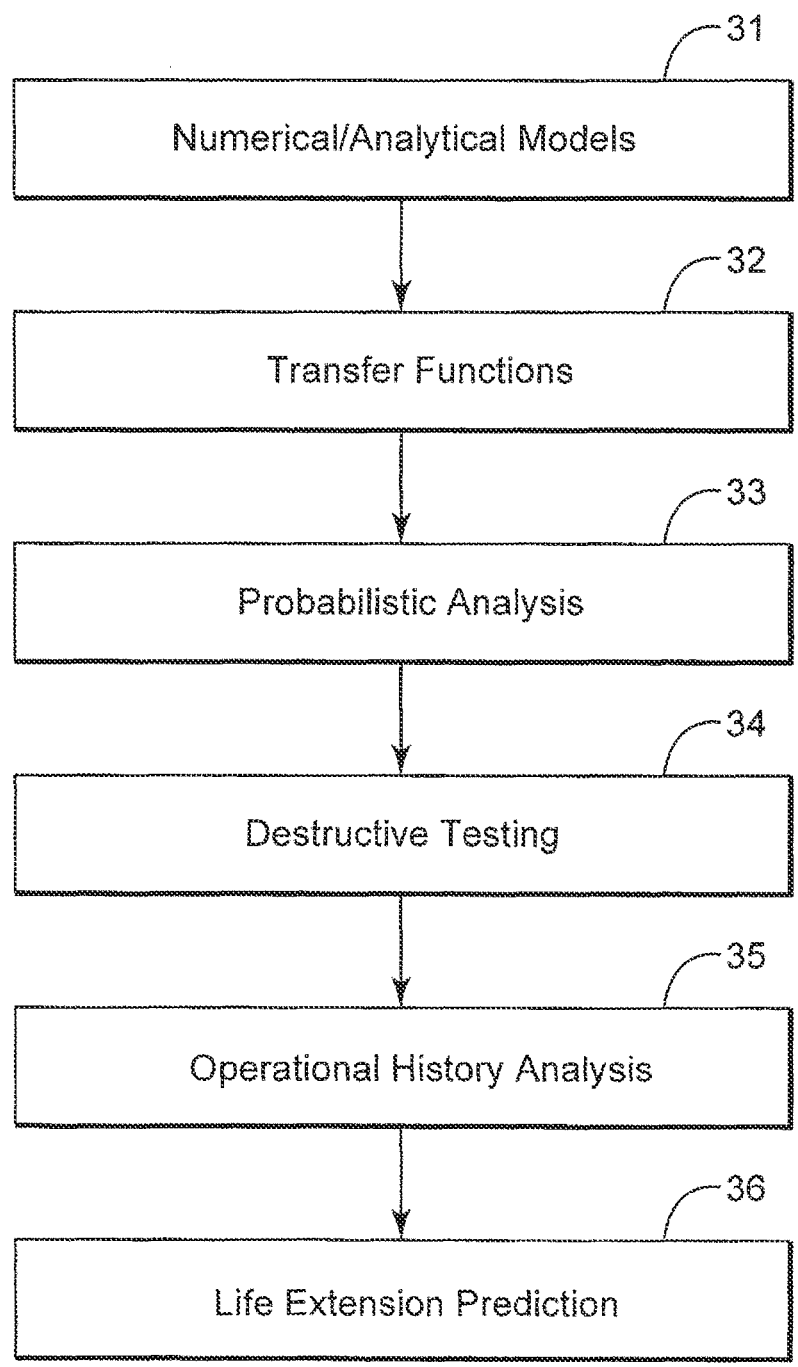
FIG. 3 illustrates analytical phases associated with an embodiment of the invention.

In one embodiment, there are 6 phases as shown in FIG. 3. While 6 phases are described, one skilled in the art would know that some phases may be skipped and others may be added. Also, while FIG. 3 shows phases flowing consecutively from 1 to 6, feedback between phases is possible, as discussed below.

In FIG. 3, numerical/analytical models of Phase 1 (31) feed various transfer functions of Phase 2 (32). The results of the transfer functions feed various probabilistic analyses (33) of Phase 3. The results of the probabilistic analyses may be used with destructive testing results of Phase 4 (34) for predicting the life of a given component. Further, the component's operating history and the non-destructive inspection shown in Phase 5 (35) may also be used when predicting the life of a given component. Results from each of the first five phases may be combined into a life extension prediction of Phase 6 (36). Details of each of these six phases are now described below. Also, while destructive tests (34) are useful to the process, these destructive tests are usually performed only once so to characterize material employed on rotor after many hours of operating life. In contrast, non-destructive tests (inspections) may be performed every time maintenance is performed on a rotor for which life extension is expected.

Phase 1 of an embodiment of the invention includes the creation of numerical/analytical models that are able to predict, e.g.: a) flow, pressure and temperature of engine primary and secondary flows; b) heat transfer coefficients between flows and rotors; c) rotor metal temperatures; and d) rotor displacements, strains and stresses. In one embodiment, the models are directed to an "ideal" gas turbine or components, i.e., based exclusively on design and manufacturing specifications that are unadulterated by "real world" experiences. In another embodiment, one or more of the models may include "real world" parameters. One or more of these models may be specific to a type of gas turbine, or may be generic. The models as well as the predicting tools may be commercially available or they may be developed in house.

The numerical/analytical models are designed to be operated in series or in parallel, depending on an overall scenario or device to be modeled. In one embodiment, the numerical/analytical models will use one or more input independent variables (vitalX's) and will output dependent variables (e.g., metal temperatures). The created models may be stored in a library or model tool kit for later use, e.g., a memory. These models use input independent variables and are capable of calculating various dependent variables that characterize the gas turbine. Examples of independent variables, vitalXs, are an ambient temperature, a rotor speed, a firing temperature, various internal geometrical clearances, etc. associated with a turbine.

Phase 2 of an embodiment of the invention includes: a) defining a specific and appropriate design of experiment (DOE) plan; b) applying one or more of the models developed in Phase 1 to the DOE to thereby generate corresponding dependent variables; and c) creating transfer functions (TFs) between c1) life variables [Z] (e.g., cycles-to-LCF (low cycle fatigue) crack initiation, hours to creep crack initiation, hours/cycles for crack to propagate in a failure, etc.) and c2) the independent variables (vitalX's) of the corresponding models. The transfer functions are either those known in the art or new functions defined for this process or a combination of both. A life variable is a variable representing a maintenance concept or concern over the life of the gas turbine or turbine component. Regarding crack initiation TFs (LCF), more particularly, there is at least one TF for each single part so to allow a replacement of just the single part at the end of life or a replacement of the full rotor, depending on what is more convenient to the customer. More particularly, there will be at least one crack propagation TF for each surface so to be able to obtain one or more indications and to reduce an amount of scraps.

Phase 3 of an embodiment of the invention includes: a) estimation/definition of vital X's distributions; b) execution of one or more MonteCarlo simulations to determine a fleet probabilistic life and/or a fleet risk of failure; and c) execution of one or more MonteCarlo simulations to set, for example, a wheel space alarm (confirmation or update of existing setting, whenever assessing mature fleet) to minimize risk of failure. A fleet is understood here to describe a class of gas turbines that have a same set of characteristics in common. The wheel space alarm is one possible example of potential alarms that exists in a gas turbine and can be lowered or increased based on the calculations described herein.

A distribution of a vitalX is now described. Suppose that various gas turbines from a fleet are provided to various customers, located around the word. An ambient temperature of the gas turbine is one independent variable, i.e., vitalX. However, an ambient temperature in Doha (Qatar) is different from an ambient temperature in Alaska. Thus, for a given vitalX (Tamb), there is a distribution of temperatures for the gas turbines that make up the fleet. This distribution may be, for example, a Gauss bell or other shapes.

If a number of data points for any measured vitalX is large enough, it will be possible to develop a reasonably accurate distribution function for the vitalX. Then, filters (e.g., Kalman filters) may be applied to tune the models with field data (e.g. crack length). However, if a number of data points for any measured vitalX is not large enough, these filters may not give accurate results. In this case, engineering judgment may be used to develop a "best guess" distribution function for the vitalX. In this case, the distribution is defined.

Returning to the wheel space alarm, it is noted that combustion turbines include a compressor having a plurality of stages that create a compressed airflow and a turbine having a turbine rotor that drives a shaft. During operation, temperatures at the turbine rotor rise significantly. Cooling may be provided by directing compressor discharge air into a wheel space that extends about the turbine rotor. Wheel space temperature may be maintained at a material limit between compressor discharge temperature and hot gas path temperature. In the event that the wheel space temperature exceeds the material limit, an alarm may be sounded to indicate an over temperature condition. When the material limit is exceeded, the turbomachine may be shut down and, after accurate inspection and study, one or more devices may be applied to provide additional cooling flow. Various factors can affect compressor discharge air temperature. For example, as ambient inlet air temperature rises, compressor discharge air rises. Thus, correctly setting a wheel space alarm is desirable and the novel process described herein is capable of adjusting this alarm.

The preceding Phases (31 to 33) are applicable to both predicting a total life span of a device/component and to the prediction of a residual life span (i.e., remaining life optimization). The following Phases are generally more applicable to the prediction of a residual life span.

Phase 4 (34) of an embodiment of the invention includes destructive laboratory testing of a statistical amount of scraped parts (in the middle or at the end of their life) to confirm if material strength is still consistent with design expectations.

Phase 5 (35) of an embodiment of the invention includes the acquisition and exploitation of a database of historical operating conditions for each specific unit. The data in the database may include a) the results of any non-destructive tests and b) inspections during the life of the component. Inspections may include one or more of the following types: eddy current inspections, magnetic particle inspections, fluorescent penetrant inspections and/or ultrasonic inspections. Optimally, such tests and inspections will have been performed on 100% of the part surfaces. Of interest is identifying operating histories that may indicate that a unit may have been operated in more benign conditions than were assumed when a manufacturer's life expectancy was estimated.

Phase 6 of an embodiment of the invention includes using the results of the previous 5 Phases to estimate a life extension of a specific part or device (i.e., estimating the risk of failure associated with extending a life of a component beyond an initial manufacturing estimated end of life). This estimation may employ statistics that encompass some or all the vitalXs that affect life expectancy of the part (e.g., operating conditions, geometrical dimensions, material properties). To simplify calculations, the number of vitalXs in this Phase (as well as in Phase 3) may be reduced (e.g., to less than 7 vitalXs). This reduction of vitalXs may be facilitated by creating (inside Phase 2) linear TFs associated to different groups of vitalXs. These linear TFs may be used to select, from each group of vitalXs, the vitalX that most effects the corresponding life variable.

A goal of Phase 6 is to use the data of the previous 5 Phases to predict if a component may have a longer life than what was predicted by the original designer (who may have used more conservative product life calculations, or who may have assumed an operating environment more severe than the actual operating environment identified in Phase 5, or who may have assumed a material strength higher than the actual material strength identified in Phase 4).

The preceding comments provided an overview of at least six phases that may be combined to generate a more accurate estimate of product life. The following comments provide additional details about at least some of these six phases.

In one embodiment, the inspections of Phase 4 may be used to support (but not validate) the calculations of Phase 6, as well as to confirm that part has been manufactured according to design and that part has even been operated and maintained according to design. In an embodiment, the inspections of Phase 4 are not used to validate the calculations of Phase 6 because the non-destructive inspections of Phase 4 are often not able to detect local fatigue or creep damage and so are often not reliable for assigning a value for accumulated damage.

More particularly, the life extension predictions of Phase 6 should rely on a material database from Phase 4 that is consistent with the estimated life. More particularly, a material creep database from Phase 4 should include tests not shorter than 1/20 times the expected life. In other words, the database should include enough information (in terms of time) to be reliable. An example in this sense is as follows. Suppose that a rotor of the gas turbine has an expected life time of 20 years. It is desirable that the database includes at least 1 year worth of information about the rotor, i.e., not shorter than 1/20 times the expected life.

The results of Phase 3 may be used to predict a fleet probabilistic life that is different from a product specification. Before and after using the results of Phase 3, any "unexpected" results should be investigated to determine if any models and/or vitalX distributions should be modified.

The results of Phase 5 may highlight unexpected defects in a part (e.g., cracks). If unexpected defects are uncovered in Phase 5, a root cause analysis (RCA) should be performed. The results of the RCA may be applied to phase 6 to further tune the life extension estimate, and may be applied to design and manufacturing to improve initial component design and production. In phase 5, cracks may be considered to be an indication of an end of the part life and should be investigated through RCA so to verify if predicting models and TFs may still be considered reliable or require modification. Alternatively, non-crack indications (e.g., scratches, marks, prints) may be acceptable but just if these non-crack indications do not appear to affect the part life. Re-machining of defects may be suggested so to make indications more smooth.

These non-crack indications (usage indicators) may be assessed generating dedicated TFs. The TF will be having same vitalXs as the other TF plus the dimensions of the indication (length, depth, thickness). As noted above, in order to reduce the amount of TFs, one embodiment may group part surfaces and define just one TF for each group of surfaces. Each group may be composed according to surfaces having a similar behavior so that a final group having a worst location may be selected as being representative of the full zone. A rotor may have hundreds, if not thousands, of small surfaces.

Figure 4:
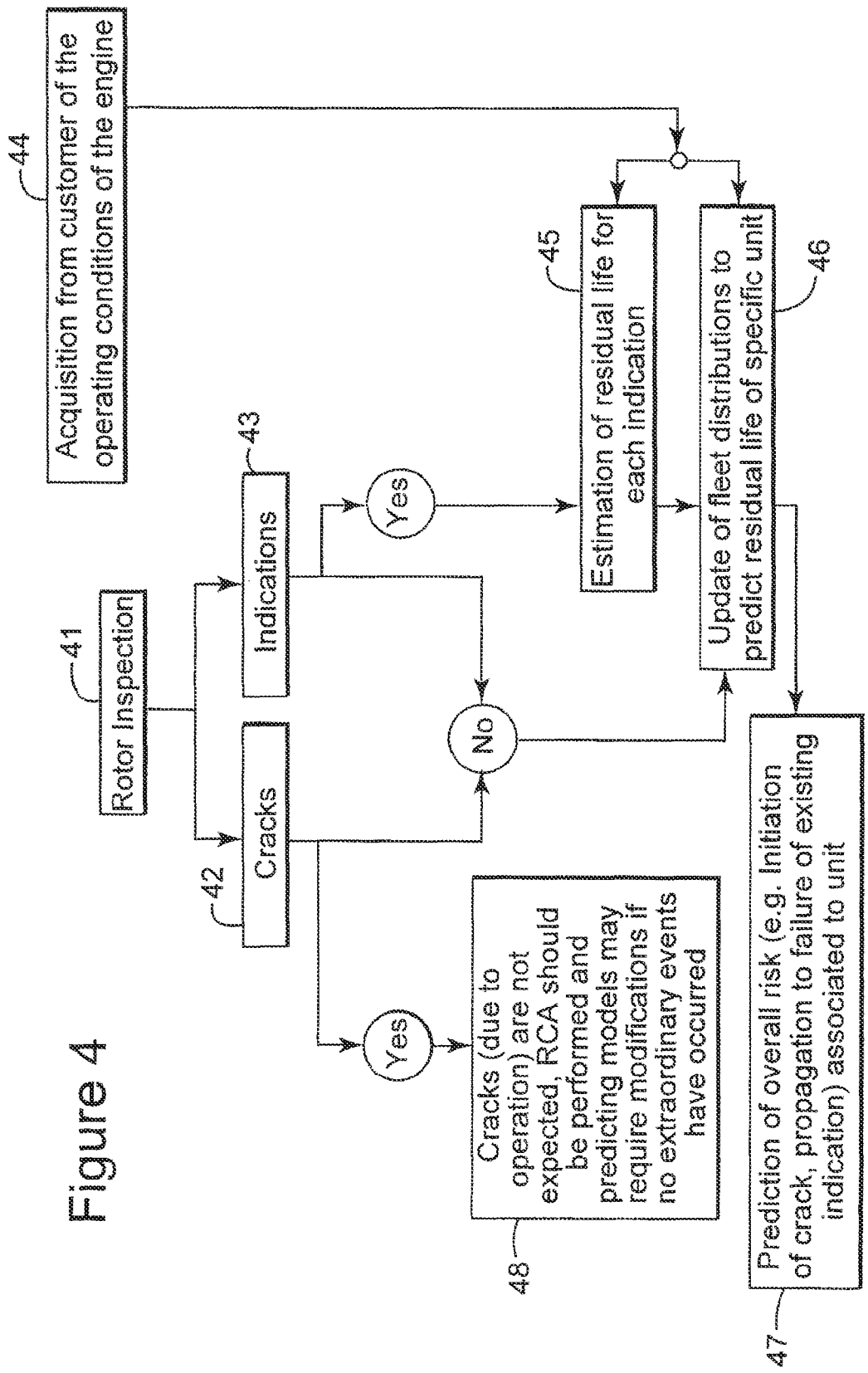
FIG. 4 illustrates a method for predicting component life according to an embodiment of the invention.

The previously described Phases may be combined into the process flow of FIG. 4. The process may begin with a turbine rotor inspection (41). The inspection determines if cracks are present (42) or if other life cycle related indications (e.g., scratches, marks, and prints) are present (43). If cracks due to operations are present, a RCA is performed (48). RCA results may be fed back to any predicting models used by the manufacturer as well as any life extension analysis. If other life cycle related indications (e.g., scratches, marks, prints) are discovered, these indications may be combined with historical operating results (44) to estimate a residual life for each indication. If neither cracks nor other indications are detected, fleet distributions may be updated to predict a residual life of a specific unit (46). For example, the Y distributions for a full fleet are generated using vitalX distributions, which include the total variability present on the fleet (e.g., $T_{amb}$ distribution will include all possible sites where machines may operate). Also, specific unit Y's having distributions which fall inside the fleet distributions typically maintain a common form (e.g., a Gaussian bell curve). However, these distributions may be narrow because one or more vitalX distributions can be replaced by a value (e.g., internal clearance) or replaced by more narrow distributions (e.g., site ambient temperature). This residual life calculation may also take into account historical operating results (44). The updated fleet distribution may be used to predict an overall risk for a unit (47). Examples of predicted risk include predictions for initiation of cracking and/or a propagation of an existing crack.

In the process of FIG. 4, items 41, 42, 43 and 44 may be considered to be part of Phase 5, with the remaining items (45, 46, 47 and 48) being associated with Phase 6. One or more of the previously described Phases 1-4 may feed results to Phase 4. This is useful because most turbine OEMs design their components so they do not form cracks during their operating life.

The methodology described above is directed to currently installed and operating gas turbines. However, one skilled in the art would know that at least the first three are applicable for a new design (e.g., life predictions for new designs).

The preceding methodology may be performed in one or more processor based devices (computers) that may or may not be connected over a wired or wireless network. The processor based device includes a processor, a memory and an input unit. The processor based device may also include a display. Such a device is discussed with regard to FIG. 6. Computer programs associated with the preceding methodology may be stored in a non-transitory storage medium such as a memory or a disk or another device.

Figure 5:
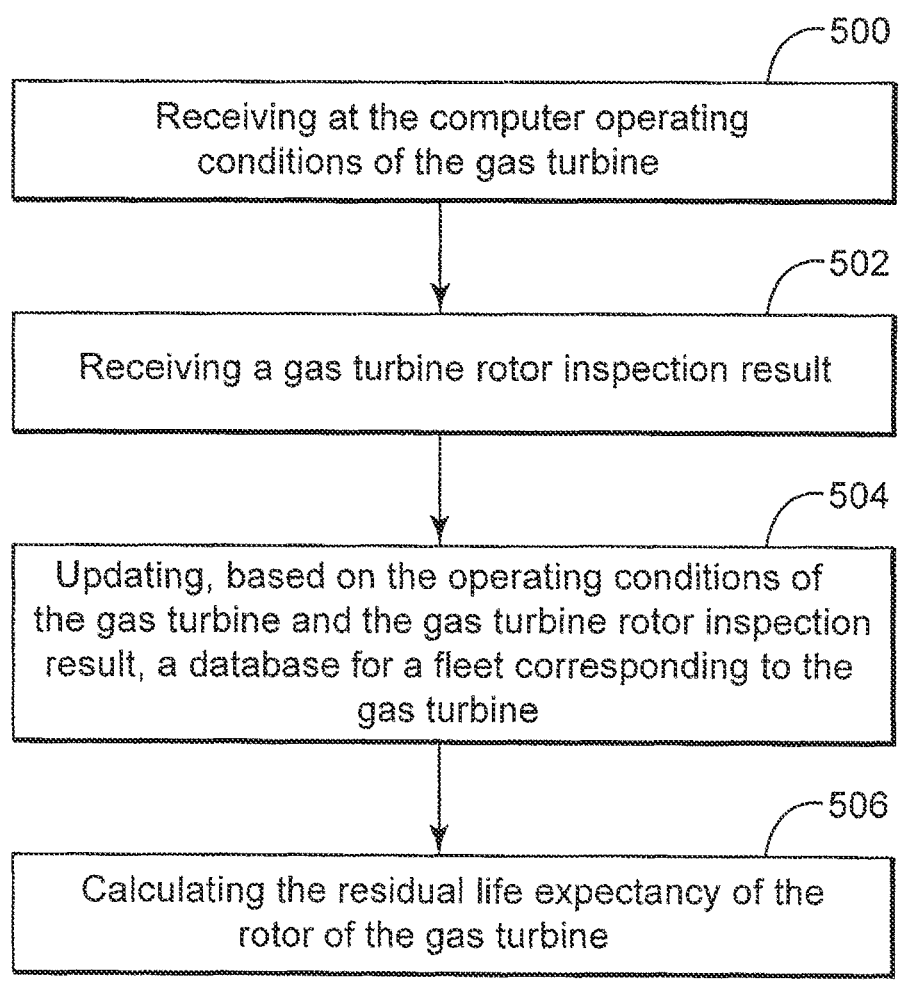
FIG. 5 illustrates another method for predicting a component life of a gas turbine according to an exemplary embodiment.

According to an exemplary embodiment illustrated in FIG. 5, there is a method for determining a residual life expectancy of a rotor of a gas turbine. The method includes a step 500 of receiving at the computer operating conditions of the gas turbine; a step 502 of receiving a gas turbine rotor inspection result; a step 504 of updating, based on the operating conditions of the gas turbine and the gas turbine rotor inspection result, a database for a fleet corresponding to the gas turbine; and a step 506 of calculating the residual life expectancy of the rotor of the gas turbine.

The above method may be implemented into a device to determine a residual life expectancy of a gas turbine component. The device may include a memory; and a processor operatively connected to the memory. The processor may be configured to receive operating conditions of the gas turbine, receive a gas turbine rotor inspection result, update, based on the operating conditions of the gas turbine and the gas turbine rotor inspection result, a database for a fleet corresponding to the gas turbine, and calculate the residual life expectancy of the rotor of the gas turbine.

The processor may be further configured to use physical models of the gas turbine to calculate plural dependent variables of the gas turbine based on independent variables, or to provide the independent variables as input to transfer functions for calculating life variables, or to receive distributions of the independent variables, or to execute Monte-Carlo simulations based on the independent variables, the distributions of the independent variables, and the transfer functions to determine the fleet probabilistic life, or to receive destructive lab tests performed on parts of the gas turbine, or to calculate the residual life expectancy of the rotor of the gas turbine based on the independent variables, the transfer functions, the MonteCarlo simulations and the destructive lab tests.

In an exemplary embodiment, a non-transitory computer based product contains instructions for determining a residual life expectancy of a component of a gas turbine, the computer based product is arranged to cause a processor based device to perform the following instructions: receiving operating conditions of the gas turbine; receiving a gas turbine rotor inspection result; updating, based on the operating conditions of the gas turbine and the gas turbine rotor inspection result, a database for a fleet corresponding to the gas turbine; and calculating the residual life expectancy of the rotor of the gas turbine and an associated risk to life extension.

Figure 6:
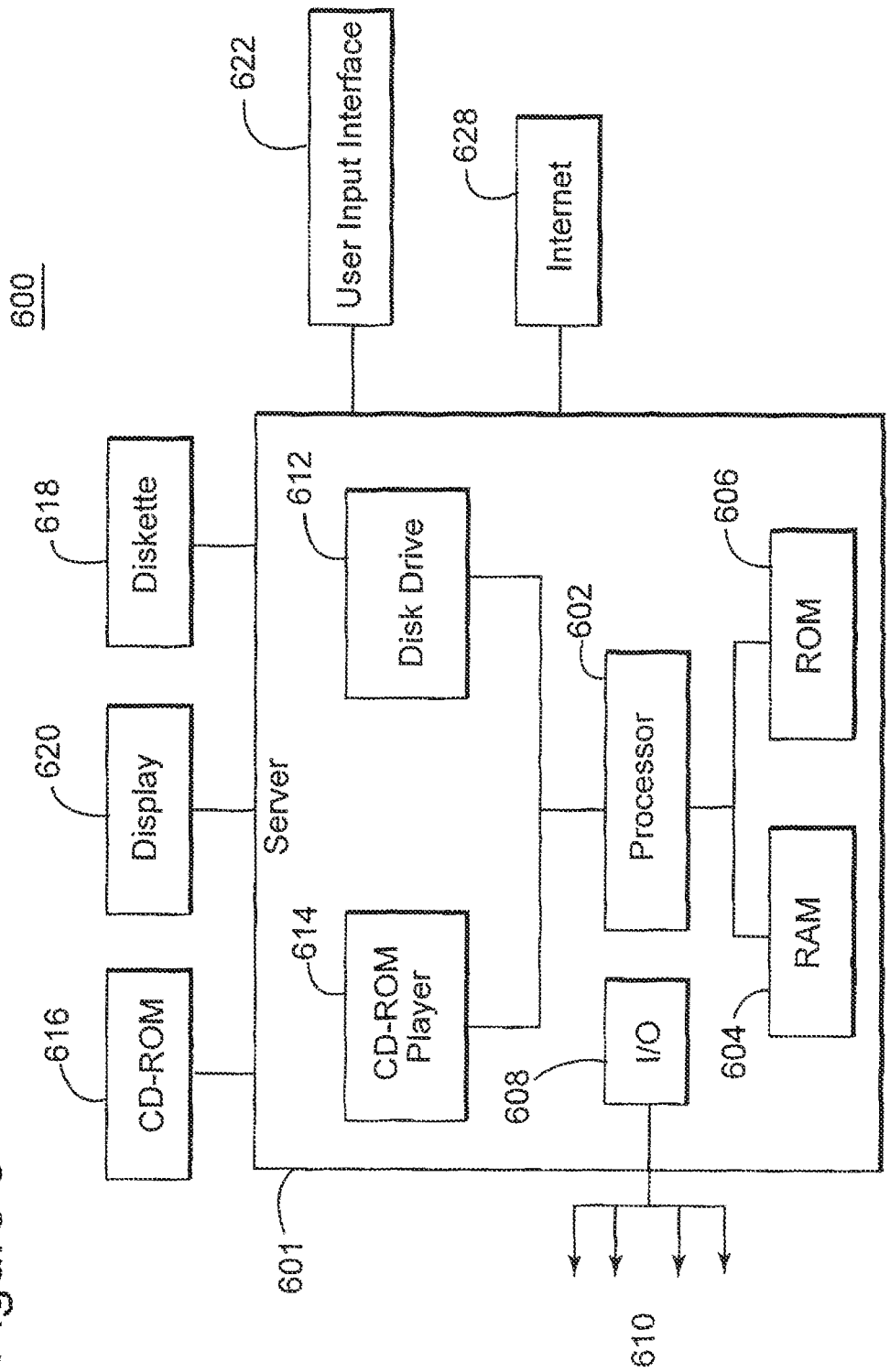
FIG. 6 illustrates a device configured to implement the method discussed herein.

An example of a representative device capable of carrying out operations in accordance with the embodiments discussed above is illustrated in FIG. 6. Hardware, firmware, software, or a combination thereof, may be used to perform the various steps and operations described herein. The computing structure 600 of FIG. 6 is an exemplary computing structure that may be used in connection with such a system.

The exemplary computing arrangement 600 suitable for performing the activities described in the exemplary embodiments may include a server 601. Such a server 601 may include a central processor (CPU) 602 coupled to a random access memory (RAM) 604 and to a read-only memory (ROM) 606. The ROM 606 may also be other types of storage media to store programs, such as, programmable ROM (PROM), erasable PROM (EPROM), etc. The processor 602 may communicate with other internal and external components through input/output (I/O) circuitry 608 and bussing 610, to provide control signals and the like. The processor 602 carries out a variety of functions as is known in the art, as dictated by software and/or firmware instructions.

The server 601 may also include one or more data storage devices, including, hard and floppy disk drives 612, CD-ROM drives 614, and other hardware capable of reading and/or storing information, such as DVD, etc. In one embodiment, software for carrying out the above discussed steps may be stored and distributed on a CD-ROM 616, diskette 618 or other form of media capable of portably storing information. These storage media may be inserted into, and read by, devices such as the CD-ROM drive 614, the disk drive 612, etc. The server 601 may be coupled to a display 620, which may be any type of known display or presentation screen, such as, LCD displays, plasma display, cathode ray tubes (CRT), etc. A user input interface 622 is provided, including one or more user interface mechanisms, such as a mouse, keyboard, microphone, touch pad, touch screen, voice-recognition system, etc.

The server 601 may be coupled to other computing devices, such as, landline and/or wireless terminals, via a network. The server may be part of a larger network configuration as in a global area network (GAN), such as, the Internet 628, which allows ultimate connection to the various landline and/or mobile client/watcher devices.

The disclosed exemplary embodiments provide a method, computer software, and device for determining a remaining life of a component of a gas turbine. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for determining a residual life expectancy of a rotor of a gas turbine, the method comprising:
   operating the gas turbine and acquiring operating conditions of the gas turbine;
   inspecting the rotor of the gas turbine and obtaining a gas turbine rotor inspection result;
   updating, based on the operating conditions of the gas turbine and the gas turbine rotor inspection result, a database for a fleet of a class of gas turbines having a set of common characteristics corresponding to the gas turbine; and
   calculating the residual life expectancy of the rotor of the gas turbine and an associated risk to life extension,
   wherein the calculating step further comprising:
   measuring independent variables of the gas turbine; and
   using physical models of the gas turbine to calculate a plurality of dependent variables of the gas turbine based on the independent variables.

2. The method of claim 1, wherein inspecting the rotor of the gas turbine comprises determining if a crack in the rotor is present, a usage indication in the rotor is present, or no event in the rotor is present.

3. The method of claim 2, wherein if an unexpected crack in the rotor is present, modifying a model of the gas turbine.

4. The method of claim 2, wherein if the usage indication in the rotor or an expected crack is present, calculating the residual life expectancy of the rotor for the usage indication or the expected crack.

5. The method of claim 2, wherein the usage indication is a mark, a scratch, or a print in the rotor, or a combination thereof.

6. The method of claim 1, further comprising:
   providing the independent variables as input to transfer functions for calculating life variables, wherein a life variable is a cycles-to-LCF (low cycle fatigue) crack initiation parameter.

7. The method of claim 6, further comprising:
   executing MonteCarlo simulations based on the independent variables, and distributions of the independent variables.

8. The method of claim 6, further comprising:
   executing Monte Carlo simulations based on the independent variables, distributions of the independent variables, and transfer functions to determine a fleet probabilistic life.

9. The method of claim 8, further comprising:
   calculating the residual life expectancy of the rotor of the gas turbine based on the independent variables, the transfer functions, the Monte Carlo simulations, and destructive lab tests.

10. The method of claim 1, wherein the independent variables of the gas turbine is an ambient temperature, a rotor speed, a firing temperature, or geometrical clearances, or a combination thereof; and the dependent variables is cycles-to-LCF (low cycle fatigue) crack initiation, hours to creep crack initiation, or hours or cycles for a crack to propagate to failure, or a combination thereof.

11. The system of claim 10, wherein if an unexpected crack in the rotor is present, the system is configured to modify a model of the gas turbine.

12. The system of claim 10, wherein if the usage indication in the rotor or an expected crack is present, the system configured to calculate the residual life expectancy of the rotor for the usage indication or the expected crack.

13. The system of claim 10, wherein the usage indication is a mark, a scratch, or a print in the rotor, or a combination thereof.

14. A system configured to determine a residual life expectancy of the gas turbine component, the system further configured to:
operate the gas turbine and acquiring operating conditions of the gas turbine;
inspect the rotor of the gas turbine and obtaining a gas turbine rotor inspection result;
update, based on the operating conditions of the gas turbine and the gas turbine rotor inspection result, a database for a fleet of a class of gas turbines having a set of common characteristics corresponding to the gas turbine, and
calculate the residual life expectancy of the rotor of the gas turbine,
wherein the system configured to calculate the residual life expectancy further comprising the system configured to:
measure independent variables of the gas turbine; and
use physical models of the gas turbine to calculate a plurality of dependent variables of the gas turbine based on independent variables.

15. The method of claim 1, further comprising conducting destructive tests on the rotor of the gas turbine.

16. The system of claim 14, wherein the independent variables of the gas turbine is an ambient temperature, a rotor speed, a firing temperature, or geometrical clearances, or a combination thereof; and the dependent variables of the gas turbine is cycles-to-LCF (low cycle fatigue) crack initiation, hours to creep crack initiation, or hours or cycles for a crack to propagate to failure, or a combination thereof.

17. The system of claim 14, wherein the system configured to inspect the rotor of the gas turbine further comprising the system configured to determine if a crack in the rotor is present, a usage indication in the rotor is present, or no event in the rotor is present.

18. The system of claim 14, wherein the system configured to calculate the residual life expectancy further comprising the system configured to provide the independent variables as input to transfer functions for calculating life variables, wherein a life variable is a cycles-to-LCF (low cycle fatigue) crack initiation parameter.

* * * * *